(12) United States Patent
Okpisz et al.

(10) Patent No.: US 6,332,179 B1
(45) Date of Patent: Dec. 18, 2001

(54) ALLOCATION FOR BACK-TO-BACK MISSES IN A DIRECTORY BASED CACHE

(75) Inventors: Alexander E. Okpisz; James N. Hardage, Jr., both of Austin, TX (US)

(73) Assignee: International Business Machines Corporation, Amonk, NY (US)

( * ) Notice: Subject to any disclaimer, the term of this patent is extended or adjusted under 35 U.S.C. 154(b) by 0 days.

(21) Appl. No.: 09/377,636

(22) Filed: Aug. 19, 1999

(51) Int. Cl.$^7$ ..................................................... G06F 12/00
(52) U.S. Cl. ............................................ 711/140; 711/128
(58) Field of Search ..................................... 711/128, 140

(56) References Cited

U.S. PATENT DOCUMENTS 5,668,968 * 9/1997 Wu ........................................... 711/3
5,781,925 * 7/1998 Larson et al. ......................... 711/140
5,835,951 * 11/1998 McMahan ............................. 711/145

* cited by examiner

*Primary Examiner*—Kevin Verbrugge
(74) *Attorney, Agent, or Firm*—Anthony V. England; Robert M. Caruell

(57) ABSTRACT

A preferred embodiment of the present invention includes a memory caching system that uses a method for allocating blocks of memory by: determining if the contents at a selected memory address are stored in the cache by comparing the selected memory address to the addresses stored in the directory, if the selected memory address is not in the cache, allocating a place in the directory for selected address, wherein, if a place in the directory for an address having the same cache line as the selected memory address is in the process of allocating or has been previously allocated, the selected memory address is allocated to that location of the pending or previous allocation.

28 Claims, 8 Drawing Sheets

ALLOCATION FOR BACK-TO-BACK MISSES IN A DIRECTORY BASED CACHE

BACKGROUND OF THE INVENTION

1. Technical Field

The present invention relates to the field of memory management in a data processing system such as a computer. More specifically, the present invention relates to a system and method for controlling allocation of memory in a cache memory to maximize storage use and minimizes retries.

2. Description of the Related Art

The rapid development of microprocessors has created many challenges. As components are more densely packed on a microprocessor, the processor's speed of operation increases. In addition, techniques such as pipelining and multiple processor systems have created processing systems with very large data throughput needs. To meet this challenge, system designers have turned to cache memory systems.

Cache memory systems rely on the principle of locality of The locality of references principle states that a computer program will spend approximately ninety percent of its time accessing ten percent of its code. In addition, the next memory address accessed is usually an address near the last address accessed. Using these principles, a small portion of the memory may be fetched into a small, extremely fast memory called a cache. Using the principle of locality of references, data with a high probability of being accessed by the processor is stored in the cache. Thus, the processor retrieves the data directly from the very fast cache memory. This means that the processor will spend as little time as possible waiting for the necessary data from memory.

The development of cache systems has reached a very high level of sophistication. It is common in microprocessor-based systems to have two or more levels of cache. Often, the first level (L1) of cache is formed on same semiconductor substrate as the microprocessor. This provides maximum throughput between the first level cache and the processor. The second level (L2) cache is often a larger memory, which may be external or internal. The L2 cache provides a larger, but slower, data storage capability.

One of the more complex systems for using cache involves the use of pipelined associative caches. These systems can provide a very high data throughput. However, the allocation of cache space must be carefully managed.

A particular problem occurs when a miss occurs on two pipelined accesses. A cache miss occurs when a processor requests memory that is not stored in the cache and must be fetched from slower memory devices. A common technique is to allocate a way or write set for the missing data upon the first detection of a cache miss. The memory system then fetches the missed data block from system memory or a lower level cache and stores it in the allocated write set.

The problem arises when, during the pendency of the block allocation, a second pipelined access requests data from the same cache line as the pending allocation in a multiple way associative cache. In this circumstance, the cache memory controller may allocate another way or write set in the cache directory. This wastes space and can cause a system failure unless the cache controller is specifically designed to handle multiple, identical, valid tags at the same index. Therefore, there is a need for a system that avoids the misallocation of cache resources.

BRIEF SUMMARY OF THE INVENTION

It is an object of the present invention to provide a memory caching system that avoids double allocation of a cache line in the directory.

It is a further object of the present invention to provide a memory caching system that avoids inefficient allocation of cache memory lines and prevents unnecessary retries.

It is a further object of the present invention to provide a system resistant to system failures caused by cache write set misallocation.

These and other objects are achieved by a memory caching system that uses a method for allocating blocks of memory by: determining if the contents at a selected memory address are stored in the cache by comparing the selected memory address to the addresses stored in the tags, if the selected memory address is not in the cache, allocating a place in the directory for selected address, wherein, if a place in the directory for an address having the same cache line as the selected memory address has been previously allocated or is in the process of allocating, the selected memory address is allocated to the location of the previous or pending allocation.

BRIEF DESCRIPTION OF THE DRAWINGS

For a more complete understanding of the present invention and the advantages thereof, reference should be made to the following Detailed Description taken in conjunction with the accompanying drawings in which.

DETAILED DESCRIPTION OF THE PREFERRED EMBODIMENT

Figure 1:
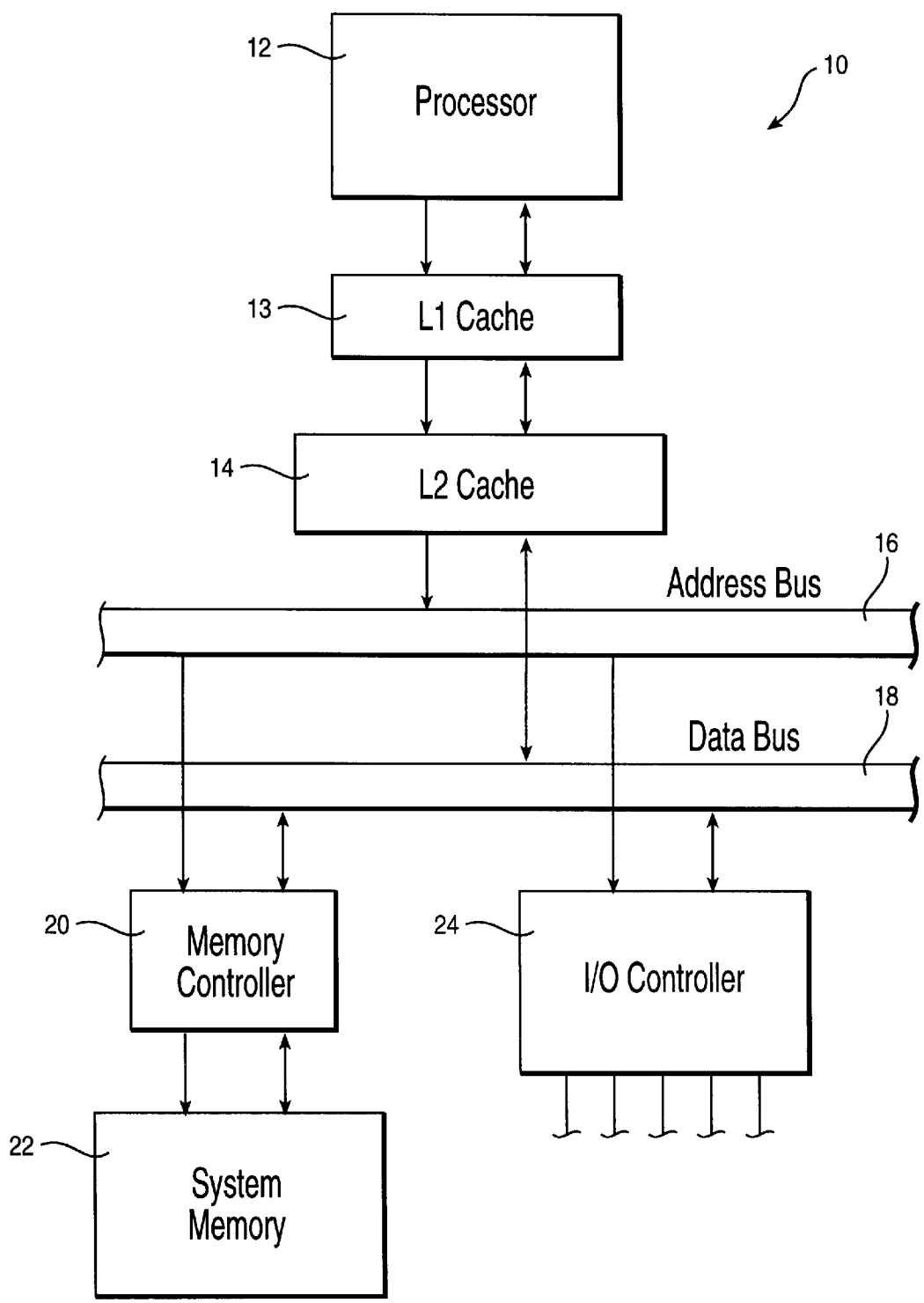
FIG. 1 is a block diagram showing the interaction of components in a simplified computing system involving cache memories.

FIG. 1 is a block diagram showing a simplified computing system including a preferred embodiment of the present invention. System 10 is a computing system using a two level cache system. Processor 12 communicates with caches 13 and 14 to write and read information from the memory system of the computer. Cache 14 is in communication with address bus 16 and data bus 18. Address bus 16 and data bus 18 provide system control and data flow, respectively, for system 10. Memory controller 20 is in communication with address bus 16 and data bus 18. Memory controller 20 provides control of the flow to and from system memory 22. Typically, system memory 22 consists of dynamic random access memory (DRAM). DRAM provides high data capacity but is slower than static random access memory (SRAM). SRAM is generally the type of memory used in cache memories because of its greater speed and relatively efficient use of power. In some cases, other high-speed memory technologies may be used, such as emitter coupled logic (ECL) memories. I/O controller 24 provides communication between address bus 16, data bus 18 and input/output devices such as a disk drive storage device, a video controller, a keyboard, etc.

Cache 13 and cache 14 are shown in this embodiment as a two-level cache memory. Single level cache memory systems may advantageously use the present invention. However, it is common in the art to use several levels of cache memory. Small, extremely fast memory is often provided in close proximity to the processors. This type of cache is known as level one (L1) cache. Higher level caches provide greater storage capacity at somewhat diminished access speeds. If requested data is not found in the L1 cache, it can be rapidly accessed from the level two (L2) or three (L3) cache. Thus, the performance penalty for a cache miss at the L1 cache is minimized because of the high-speed access available from the L2 or L3 caches.

Figure 2:
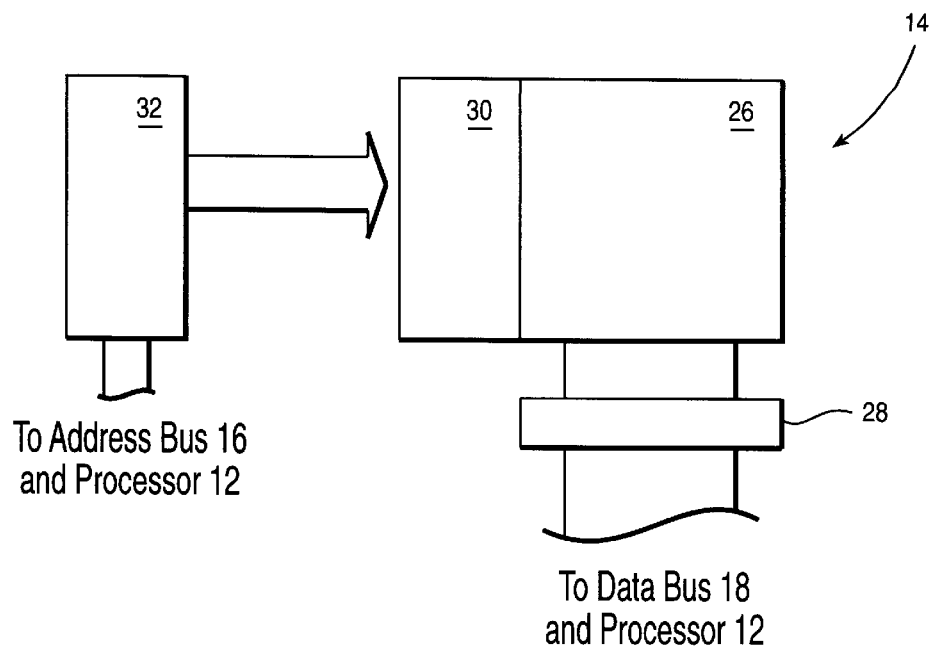
FIG. 2 is a block diagram showing the internal components of cache 14.

FIG. 2 is a block diagram showing the internal structure of cache memory 14. Data is stored in memory array 26. Data communication with data bus 18 and processor 12 occurs via I/O buffer 28. Cache memory 14 is a conventional single port (single I/O) memory. Dual port memories may be advantageously used for higher I/O throughput, but their use adds considerable system complexity. Directory 30 stores addressing and control information for the data stored in array 26. Data is addressed and accessed by cache controller 32, which accepts addresses from address bus 16 and processor 12. Controller 32 determines what is stored in array 26, directory 30 and where it is stored. It also determines what data will be discarded and when a system memory fetch is necessary.

Figure 4:
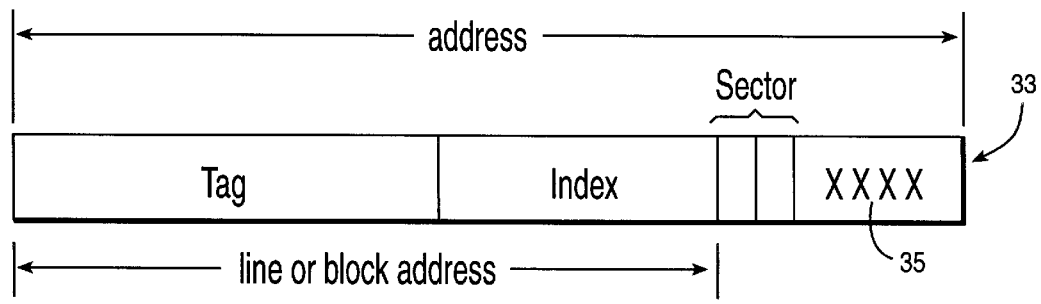
FIG. 4 is a chart showing the different components of a data address.
Figure 3:
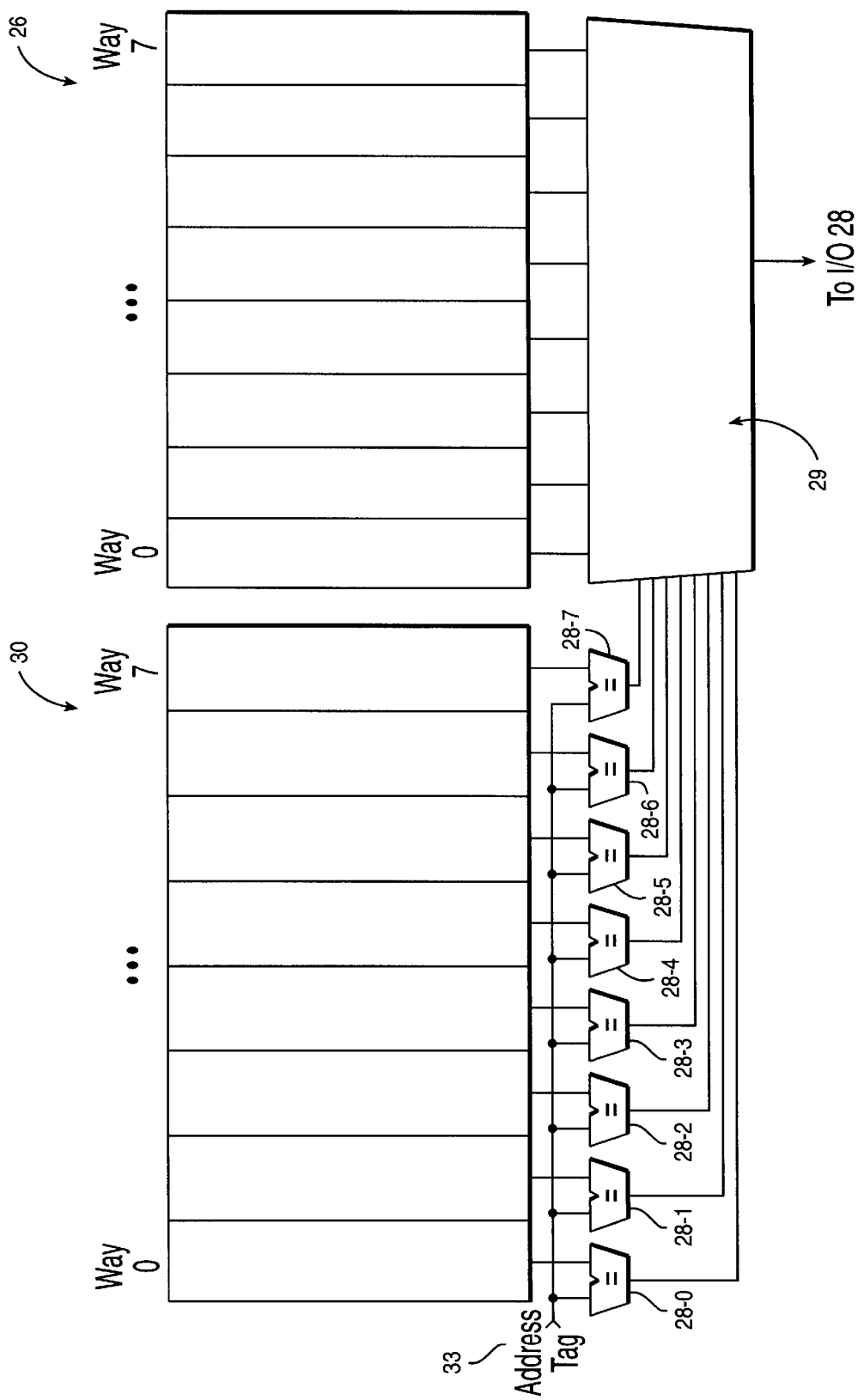
FIG. 3 is a schematic diagram showing the system for determining if a tag for addressed data is stored in the cache.

FIG. 3 is a schematic diagram showing the interaction of the directory 30 and the data array 26 in cache 14. The memory of cache 14 is an eight way associative cache. Both directory 30 and data array 26 are organized into eight ways (Way0–Way7). Cache 14 is shown as an eight way associative cache for exemplary purposes only. The present invention my be advantageously used in memories of other configurations. When data is requested from cache 14, the cache controller parses the address as shown in FIG. 4.

The bits devoted to the Tag and Index are assigned depending on the size of the cache and the levels of association. The tag and index bits are followed by the sector bits. In this example, the number of sectors is four, so there are two sector bits. Sectoring allows coherency on a sub-line basis and is typically employed to reduce the size of the directory array. The address also contains "don't care" bits 35, with respect to the cache, that identify each byte within a sector. Cache controller 32 does not care about this address information because data is read and written a sector at a time in cache 14. The organization of the data into sectors is not necessary to enjoy the advantages of the present invention, but is used in the preferred embodiment.

Returning to FIG. 3, the index value indicates a unique tag storage place in each way of directory 30. When addressed, one tag from each way is read to comparators 28-0 through 28-7 and compared to the selected address tag. If there is a cache hit, one of the comparators will indicate this and the associated way in data array 26 will be selected by multiplexer 29. The particular line of array 26 in each way is selected by the index.

Figure 5:
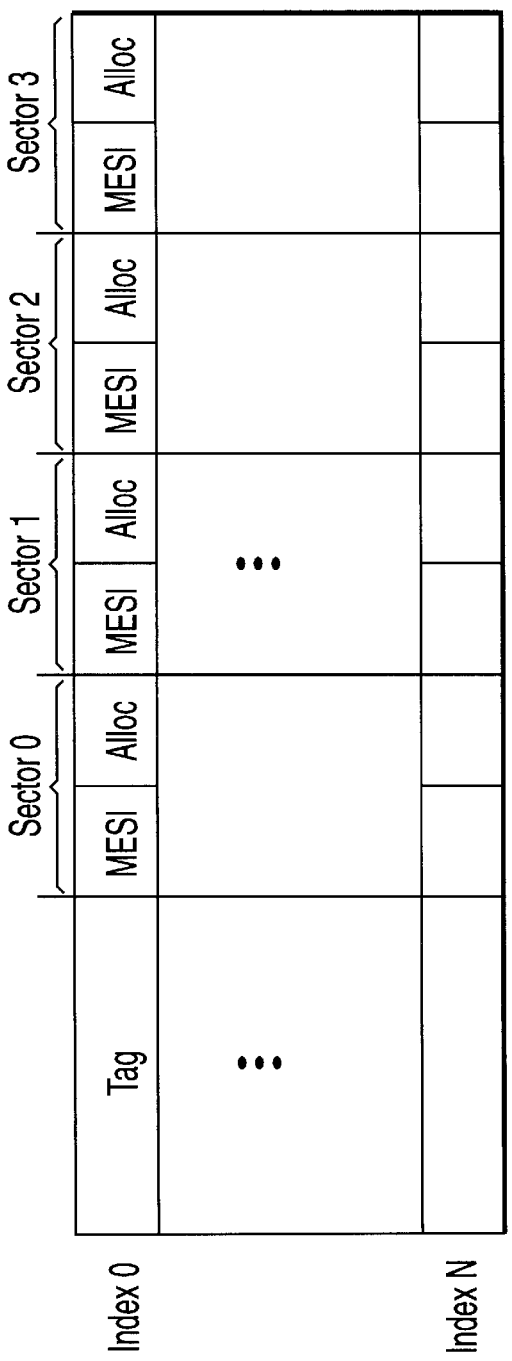
FIG. 5 is a chart showing the organization of one way of directory 30.
Figure 6:
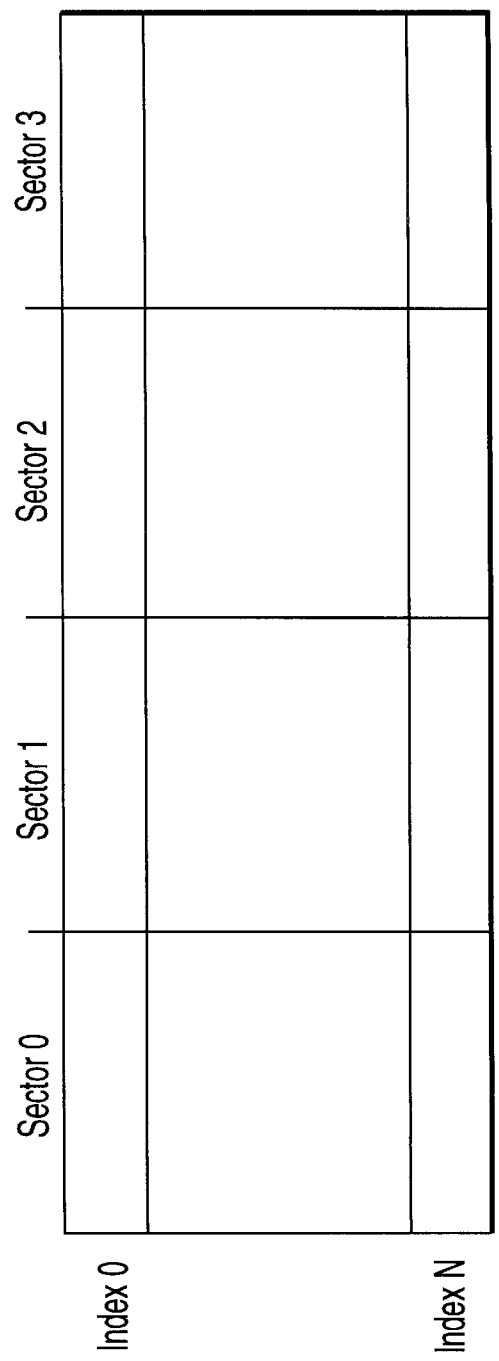
FIG. 6 is a chart showing the organization of one way of memory array 26.

FIG. 5 is a table showing the organization of one way of directory 30. Each line of the directory stores a tag plus MESI bits and allocation bits (Alloc) for each sub-block or sector. MESI stands for Modified/Exclusive/Shared/Invalid. This information indicates the status of the data stored in the associated sector. The allocation bit indicates when a tag location has been allocated to a write set or way in the event of a cache miss. FIG. 6 is a table showing the organization of data stored in one way of data array 26. Each line of the way is uniquely identified by an index value. In addition, each line is divided into sectors.

Figure 7:
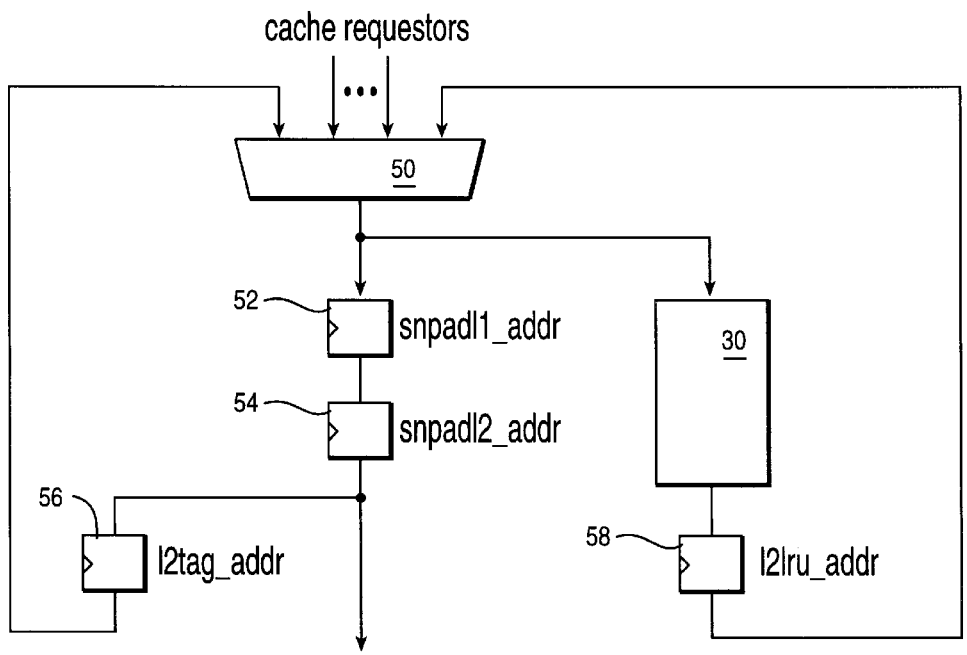
FIG. 7 is a logic diagram of the address pipeline of cache 14.

A portion of the address flow in cache controller 32 is represented in FIG. 7. Multiplexer 50 selects one of the address sources based on the operational status of the cache. Normally, one of the addresses provided by cache requesters will be used. The selected address is stored for one clock cycle in each of registers 52 and 54. If a cache miss has occurred, the delayed address in register 56 will be used in the allocate and fetch processes, and is selected by multiplexer 50. The other address path shown is the path to directory 30. This provides the path illustrated in FIG. 3 where the selected address indexes into the cache and the tag is compared to the address tags stored in directory 30. In case of a cache miss, a write set will be allocated for the new data. The address of the old data or victim set is written to register 58. This address may be important if it is necessary to write from the cache to system memory 22 to maintain data integrity and coherency.

Figure 8:
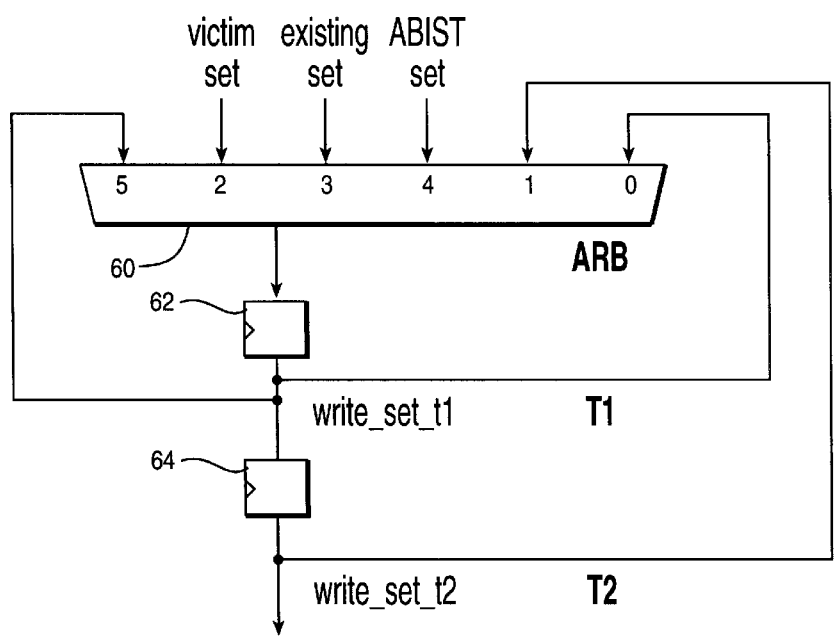
FIG. 8 is a logic diagram of the write set pipeline of cache 14.

FIG. 8 is a logical flow diagram of the write set flow in cache controller 32. When data is to be written to cache 14, an appropriate write set must be designated. If data is to be written for an address for which a write set has already been allocated, multiplexer 60 selects input 3. If the line address in register 56 is the same as stored in register 52 and register 52 corresponds to a pending allocation, input 0 is selected and the pending allocation's write set stored in register 62 is selected by multiplexer 60, thus forcing the second allocation to the same line to occur to the same way. If the line address in register 56 is the same as stored in register 54 and register 54 is a pending allocation, input 1 is selected and the pending allocation's write set stored in register 64 is selected by line to occur to the same way. If a new write set must be assigned, input 2 is used which provides the new victim set based on the selected victim set logic criteria. The write set may be selected by several strategies known in the art. For example, the selection may be random, it may be by the least-recently used (LRU), first-in, first-out (FIFO), most-recently used (MRU), least-frequently used (LFU), or most-frequently used (MFU) systems. Input 4 is selected in a test procedure and input 5 is used as a holding loop due to allow for arbitration priorities of the cache controller.

Figure 9:
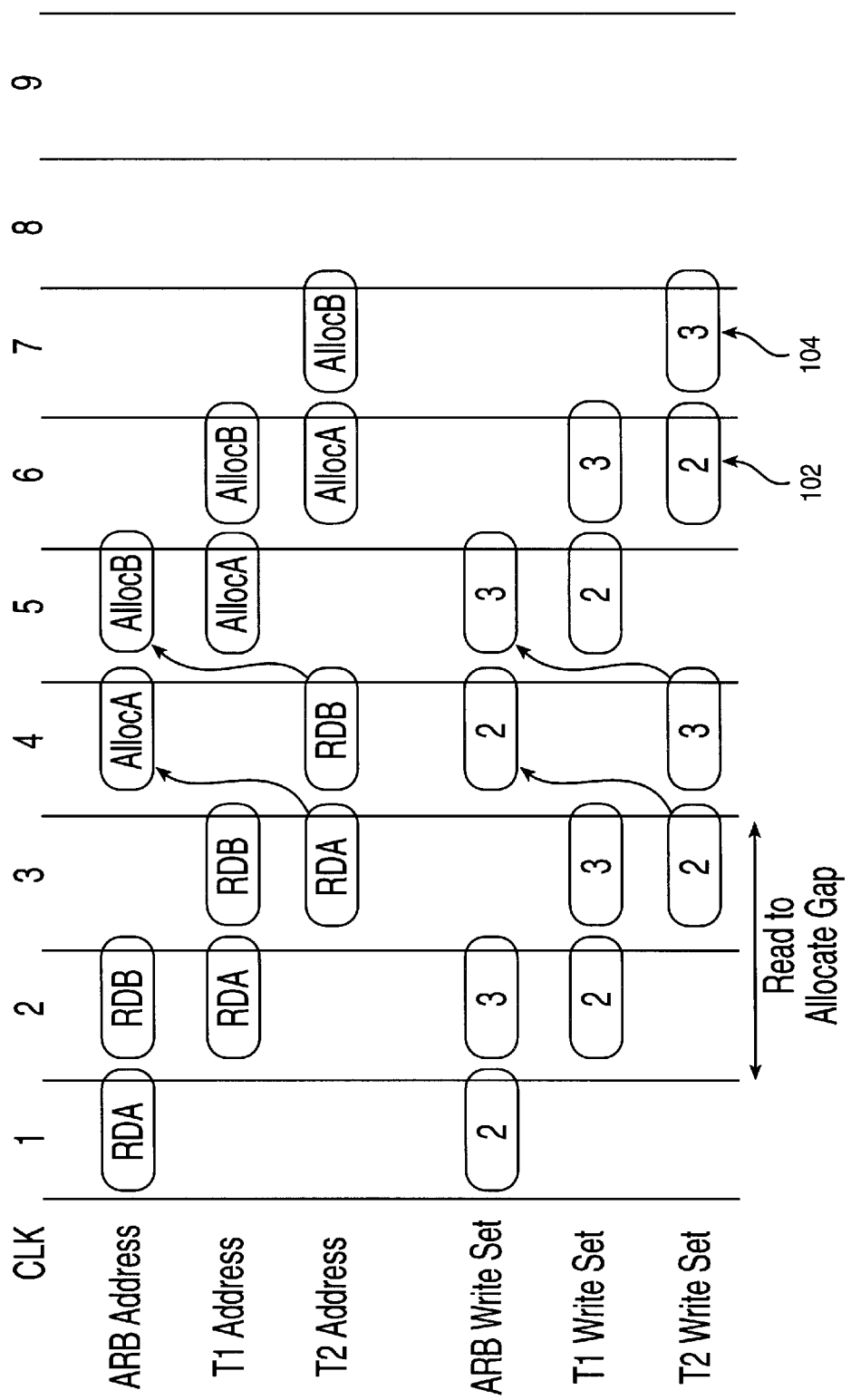
FIG. 9 is a timing diagram showing the steps involved in a prior art system which lead to the misallocation of cache memory write sets.

FIG. 9 is a timing diagram showing a problem in prior art cache systems. In the diagram, the address for Read A (RDA) is provided to cache 14 by a processor. Three clock cycles are required for the cache controller circuitry to compare the address tag using the index and determine that the data requested is not located in cache 14. A write set in directory 30 is then allocated to reserve a place for missed address of RDA. However, before the allocation, another address request may be processed for another address (RDB) within the same line as RDA. The time from the issuance of RDA until allocation is called the read-to-allocate gap. If the cache controller does not recognize that an allocation for that cache line is pending, an allocation B (AllocB) will be issued using the same cache line address. Thus, two write sets 2 (at 102) and 3 (at 104) allocate different ways for the same line. This needlessly wastes cache space. In addition, unless the cache controller is designed to handle multiple directory allocations of the same index and tag, system failure can occur.

Figure 10:
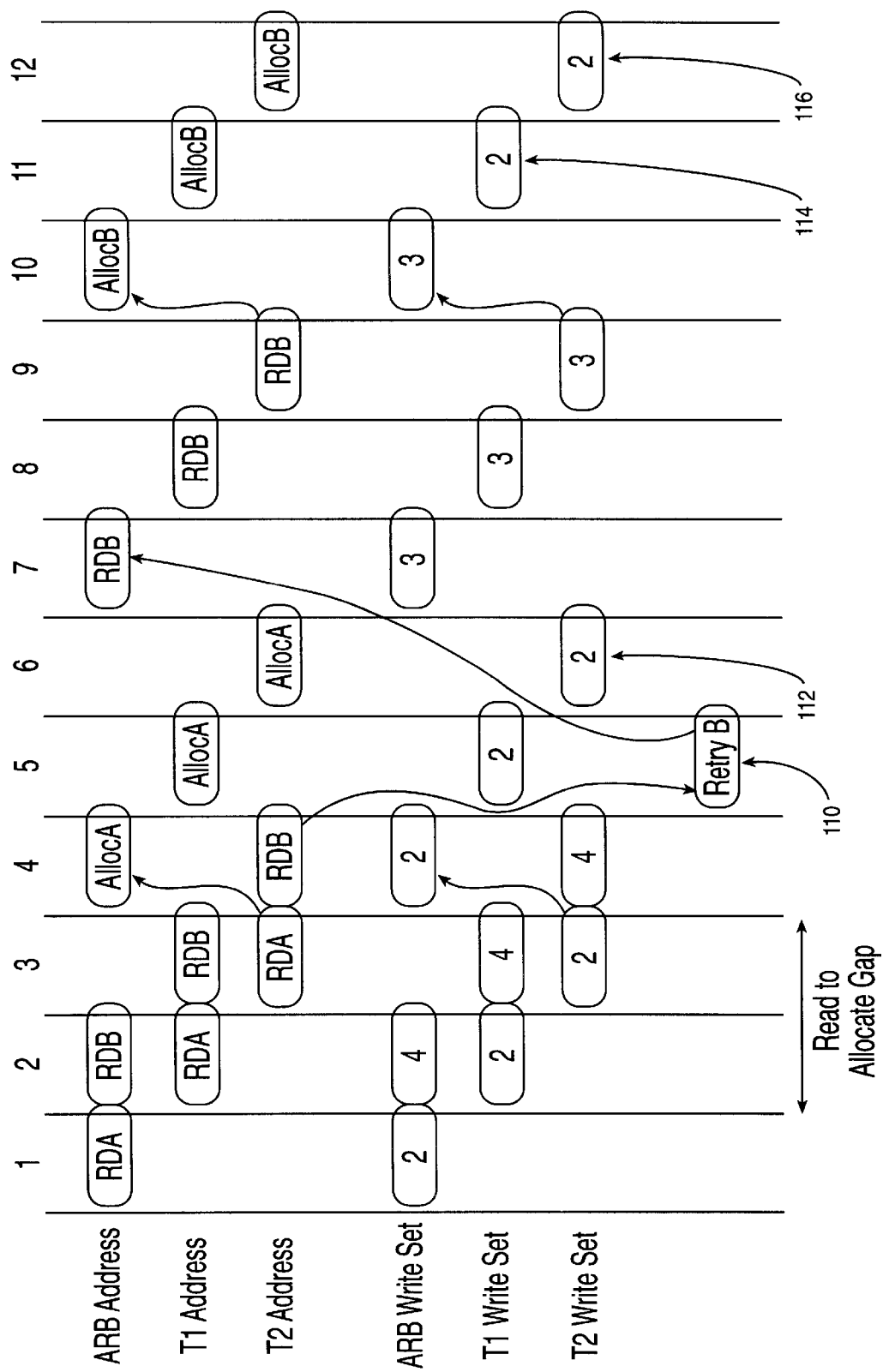
FIG. 10 is another timing diagram showing another prior art system that avoids misallocation, but imposes a performance penalty, by blocking allocation and forcing a retry.

One prior art way to handle the problem is illustrated by the timing diagram of FIG. 10. With the system illustrated in FIG. 10, a retry system is used. A retry command (RetryB issued at 110) is provided every time a read occurs to a matching cache line address in the read-to-allocate gap. This retry allows time for AllocA to resolve at 112. After AllocA is resolved, the allocation of write set 2 can be seen at 114 and AllocB allocates using write set 2 at 116. However, with this system, the RDB command execution is delayed by several clock cycles, hurting cache performance.

Figure 11:
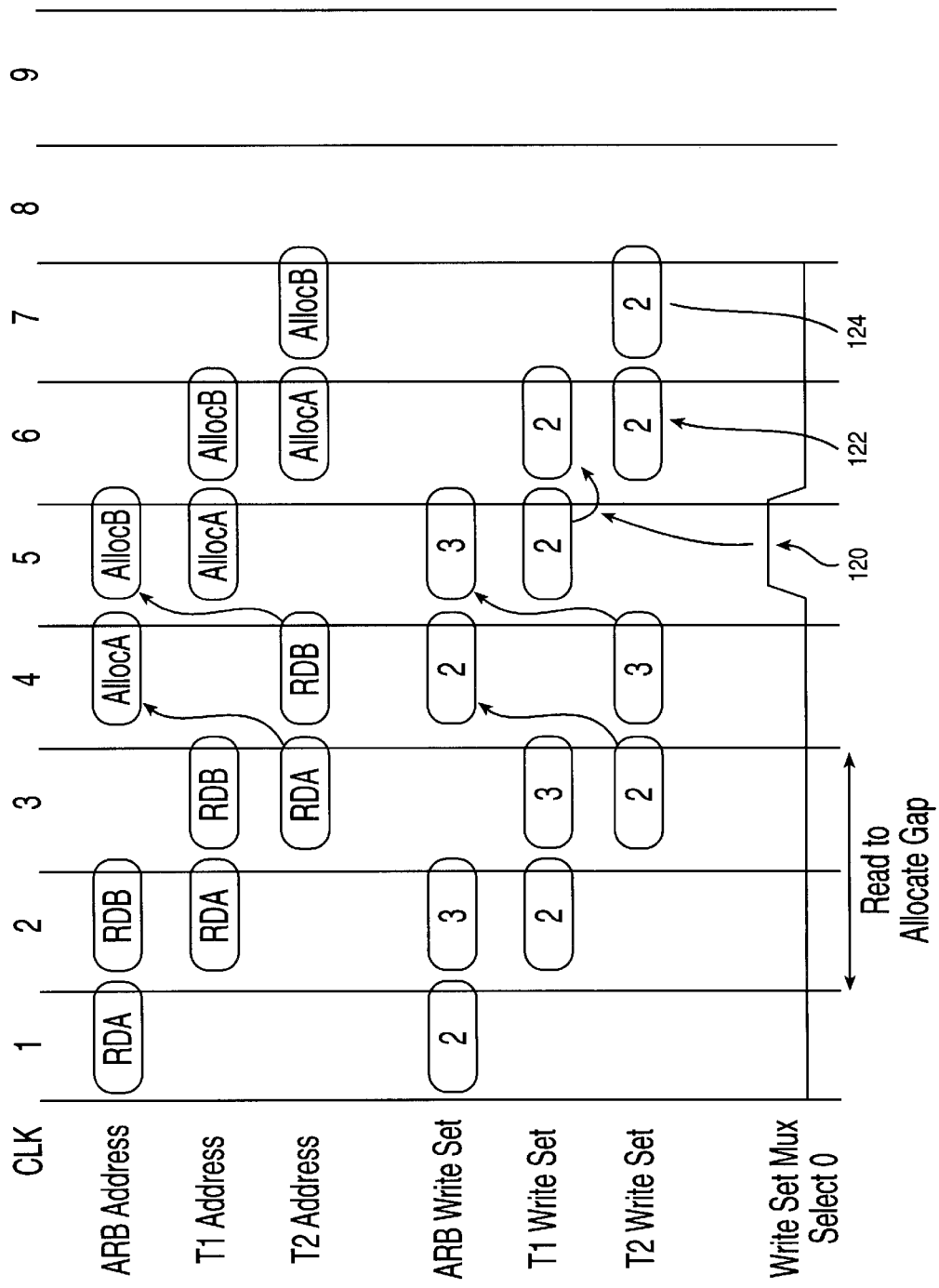
FIG. 11 is a timing diagram showing the operation of the present invention, which prevents the misallocation of cache memory write sets and avoids a performance penalty.

The problems illustrated by FIGS. 9 and 10 are solved by the system according to the present invention as illustrated in FIG. 11. In the system of FIG. 11, no retry system is required to avoid double allocation for the same cache line. In the system of FIG. 11, when a read miss such as RDB occurs, the last two or more addresses corresponding to cache allocations are compared to the address of allocation AllocB. If the address of AllocB corresponds to a line address in the process of allocating, i.e. in register 52 or 54, multiplexer 60 selects the pending, matching allocation's write set at 120. The allocate B access will then allocate using the same write set (124) as the matching, pending allocation (122). Therefore, the allocation of the same line to two different ways is avoided without a performance penalty.

Although specific embodiments are described herein, they are not to be construed as defining the scope of the present invention. For example, system memory in the above-described embodiment is DRAM. However, the invention may be advantageously applied when disk drive, bubble memories or any other techniques for storing data is used. In another example, although the system described uses a single processor, the invention is equally applicable to multiprocessor systems. The present invention is limited only by the claims appended hereto.

What is claimed is:

1. A memory system including a cache memory comprising:
 a plurality of memory blocks, each memory block being associated with a tag stored in a directory; and
 a controller for determining if the contents at a selected memory address are stored in the cache by comparing the selected memory address to the addresses stored in the directory, if the selected memory address is not in the cache, allocating a place in the directory for selected address, wherein, if a place in the directory for an address having the same cache line as the selected memory address is in the process of allocation or has been previously allocated, the selected memory address is allocated to that location of the pending allocation or previously allocated place in the directory.

2. A memory system as in claim 1 wherein the memory system provides data storage and retrieval for a multiprocessor system.

3. A memory system as in claim 1 wherein the cache memory is a static random access memory.

4. A memory system as in claim 1 wherein the data assigned to each tag is divided into sectors containing 32 bytes of data.

5. A memory system as in claim 1 wherein the cache memory is one of a plurality of cache memories, each of the plurality of cache memories providing a different cache level.

6. A memory system as in claim 1 wherein the blocks of memory of the cache memory are addressed using a fully associative addressing scheme.

7. A memory system as in claim 1 wherein the blocks of memory of the cache memory are addressed using a set associative addressing scheme.

8. A processing system comprising:
 at least one processor;
 a system memory; and
 a cache memory that caches data stored in the system memory for delivery to the processor in response to access commands from the processor, comprising:
 a plurality of memory blocks, each memory block being associated with a tag; and
 a controller for determining if the contents at a selected memory address are stored in the cache by comparing the selected memory address to the addresses stored in the directory, if the selected memory address is not in the cache, allocating a place in the directory for selected address, wherein, if a place in the directory for an address having the same cache line as the selected memory address is in the process of allocation or has been previously allocated, the selected memory address is allocated to that location of the pending allocation or previously allocated place in the directory.

9. A processing system as in claim 8 wherein the at least one processor comprises a plurality of processors.

10. A processing system as in claim 8 wherein the cache memory is a static random access memory.

11. A processing system as in claim 8 wherein the data assigned to each tag is divided into sectors containing 32 bytes of data.

12. A processing system as in claim 8 wherein the cache memory is one of a plurality of cache memories, each of the plurality of cache memories providing a different cache level.

13. A processing system as in claim 8 wherein the blocks of memory of the cache memory are addressed using a fully associative addressing scheme.

14. A processing system as in claim 8 wherein the blocks of memory of the cache memory are addressed using a set associative addressing scheme.

15. A method for allocating blocks of memory in a cache memory, comprising the steps of:
 determining if the contents at a selected memory address are stored in the cache by comparing the selected memory address to the addresses stored in the directory;
 if the selected memory address is not in the cache, allocating a place in the directory for selected memory address, wherein, if a place in the directory for an address having the same cache line as the selected memory address is in the process of allocation or has been previously allocated, the selected memory address is allocated to that location of the pending allocation or previously allocated place in the directory.

16. A method as in claim 15 wherein the cache memory is included in a memory system that provides data storage and retrieval for a multiprocessor system.

17. A method as in claim 15 wherein the cache memory is a static random access memory.

18. A method as in claim 15 wherein the data assigned to each tag is divided into sectors containing 32 bytes of data.

19. A method as in claim 15 wherein the cache memory is one of a plurality of cache memories, each of the plurality of cache memories providing a different cache level.

20. A method as in claim 15 wherein the blocks of memory of the cache memory are addressed using a fully associative addressing scheme.

21. A method as in claim 15 wherein the blocks of memory of the cache memory are addressed using a set associative addressing scheme.

22. A method for data processing comprising the steps of:

providing at least one processor;

providing a system memory; and providing a cache memory that caches data stored in the system memory for delivery to the processor in response to access commands from the processor, the cache memory including a plurality of memory blocks, each memory block being associated with a tag;

determining if the contents at a selected memory address are stored in the cache by comparing the selected memory address to the addresses stored in the directory;

if the selected memory address is not in the cache, allocating a place in the directory for selected memory selected address, wherein, if a place in the directory for an address having the same cache line as the selected memory address is in the process of allocation or has been previously allocated, the selected memory address is allocated to that location of the pending allocation or previously allocated place in the directory.

23. A method as in claim 22 wherein the at least one processor comprises a plurality of processors.

24. A method as in claim 22 wherein the cache memory is a static random access memory.

25. A method as in claim 22 wherein the data assigned to each tag is divided into sectors containing 32 bytes of data.

26. A method as in claim 22 wherein the cache memory is one of a plurality of cache memories, each of the plurality of cache memories providing a different cache level.

27. A method as in claim 22 wherein the blocks of memory of the cache memory are addressed using a fully associative addressing scheme.

28. A method as in claim 22 wherein the blocks of memory of the cache memory are addressed using a set associative addressing scheme.

* * * * *

UNITED STATES PATENT AND TRADEMARK OFFICE
CERTIFICATE OF CORRECTION

PATENT NO. : 6,332,179 B1
DATED : December 18, 2001
INVENTOR(S) : Okpisz et al.

It is certified that error appears in the above-identified patent and that said Letters Patent is hereby corrected as shown below:

Title page,
Item [74], please delete "Anthony V. England; Robert M. Caruell" and insert
-- Anthony V. England; Robert M. Carwell --;

Column 1,
Line 19, after "locality of" please insert -- references to provide high-speed access to data stored in memory. --.

Signed and Sealed this

Twentieth Day of August, 2002

*Attest:*

JAMES E. ROGAN
*Attesting Officer*     *Director of the United States Patent and Trademark Office*